United States Patent [19] [11] 4,443,399
Takashige et al. [45] Apr. 17, 1984

[54] METHOD OF PRODUCING BIAXIALLY ORIENTED SHEET OR FILM AND APPARATUS THEREFOR

[75] Inventors: Masao Takashige; Kazuhisa Kaneda; Naotaka Murakami, all of Chiba, Japan

[73] Assignee: Idemitsu Petrochemical Co., Ltd., Tokyo, Japan

[21] Appl. No.: 370,240

[22] Filed: Apr. 21, 1982

[30] Foreign Application Priority Data

May 7, 1981 [JP] Japan .................................. 56-68598

[51] Int. Cl.³ .............................................. B29F 3/08
[52] U.S. Cl. .................................... 264/519; 264/567; 264/568; 264/146; 264/210.5; 264/290.2; 264/DIG. 65; 425/326.1; 425/387.1; 425/388; 425/174.4
[58] Field of Search ............... 264/567, DIG. 65, 568, 264/235.6, 235.8, 521, 210.5, 290.2, 519, 40.6, 146; 425/326.1, 387.1, 388, 526, 174.4

[56] References Cited

U.S. PATENT DOCUMENTS

| 2,688,773 | 9/1954 | McIntire | 264/567 |
| 3,248,463 | 4/1966 | Wiley et al. | 264/567 |
| 3,288,317 | 11/1966 | Wiley | 264/567 |
| 3,313,870 | 4/1967 | Yazawa | 264/567 |
| 3,496,258 | 2/1970 | Wiley | 264/521 |
| 3,865,912 | 2/1975 | Rosenkranz et al. | 264/521 |
| 3,950,459 | 4/1976 | Seefluth | 264/521 |

FOREIGN PATENT DOCUMENTS

| 260411 | 9/1963 | Australia | 264/567 |
| 1239839 | 5/1967 | Fed. Rep. of Germany | 264/567 |

Primary Examiner—Jeffery R. Thurlow
Attorney, Agent, or Firm—Flynn, Thiel, Boutell & Tanis

[57] ABSTRACT

A method of producing a biaxially oriented sheet or film, wherein molten resin is simultaneously, biaxially oriented in a direction of extruding the molten resin and in a direction perpendicular thereto, and an apparatus therefor, are disclosed. In the method of producing a biaxially oriented sheet or film, the molten resin is extruded into a tubular form in the horizontal direction, once cooled, thereafter, in heating the tubular resin prior to the biaxial orientation, the tubular resin is uniformly heated with the heating applied on the vertically lower side and the heating applied on the vertically upper side of the tubular resin being controlled separately of each other so as to prevent the ununiformity of the heating of the tubular resin in the circumferential direction thereof due to the elevation in heat caused by a thermal convection phenomenon, and then, the tubular resin is biaxially oriented.

15 Claims, 7 Drawing Figures

METHOD OF PRODUCING BIAXIALLY ORIENTED SHEET OR FILM AND APPARATUS THEREFOR

BACKGROUND OF THE INVENTION

1. Field of the Invention

This invention relates to a method of producing a biaxially oriented sheet or film and an apparatus therefor, more specifically to a method of producing a biaxially oriented sheet or film, wherein a thermoplastic resin having a high rigidity such as polystyrene is subjected to simultaneous biaxial orientation in a horizontal direction to be formed into a resin sheet or a resin film, and an apparatus therefor, and particularly to a method of producing a resin sheet preferably having a thickness of about 0.1 mm or more and an apparatus therefor.

2. Description of the Prior Art

Heretofore, there have been known a tenter method and a tubular method as the simultaneous biaxial orientation methods used for the thermoplastic resin. According to the tenter method, the resin is oriented by use of a tenter in a direction of transfer and in a widthwise direction of the resin. However, this tenter method presents such disadvantages as the equipment required becomes large sized in construction and the trimming loss caused during tentering is high, and hence, the tubular method is generally desirable.

As for this tubular method, in recent years, a two-stage compressed-air orientation method has been developed and used for polypropylene, polyethylene and the like. As shown in FIG. 1, according to this method, molten resin is extruded into a tubular form from a die 1 vertically downwardly (or upwardly). Compressed air is fed to the interior of the tubular resin through a first compressed air feed pipe 2. The tubular resin is cooled and regulated in shape or sized by a cooling vessel 3 provided on the outer periphery of the tubular resin. Thereafter the tubular resin is clamped by first nip rolls 4, and then compressed air having pressure required for orientation is fed through a second compressed air feed pipe 5 to orient the tubular resin. The tubular resin is clamped again by second nip rolls 6 and subjected to heat treatment by a heating air ring 7 to stabilize the orientation of the resin. The tubular resin is thereafter flattened by a bubble guide member 8, while being heated by a heater 9, so as to prevent wrinkles, crazings and the like from occurring. The resin is then folded by third nip rolls 10, and thereafter, pleats formed at opposite ends thereof are cut away, and the resin is wound into a takeup roll 11.

The method of the type described has presented such disadvantages that polystyrene resin having a very high rigidity, or some other thermoplastic resin, which is to be formed into a sheet having a large thickness, cannot be oriented because cracks take place in a tubular resin, and cannot be used commercially because of wrinkles, sags, distortions and the like caused during folding and flattening.

When polystyrene resin or one of the other thermoplastic resins is subjected to simultaneous biaxial orientation by a one-stage compressed-air method, molten resin, which has been extruded into a tubular form, is once cooled, and thereafter, reheated. However, polystyrene and the like are very low in thermal conductivity, and hence, a fairly large reheating region has been required to keep the inner side and the outer side of the tubular resin at a uniform temperature, thus presenting the disadvantages that the apparatus should necessarily be increased in its height, the installation is limited in position, operation of the apparatus becomes difficult and the safety of operators is not desirably ensured. Further, even if the conventional tenter method is used for polystyrene resin or the like, the trimming loss is high in the same manner as aforesaid and is not desirable from the viewpoint of the production efficiency.

SUMMARY OF THE INVENTION

The present invention has as its object the provision of a method capable of stably and safely producing a simultaneously biaxially oriented sheet or film and an apparatus therefor.

To achieve the above-described object, in the present production method according to the present invention, there is adopted a horizontal direction, one-stage compressed-air, simultaneous biaxial orientation method, in which thermoplastic resin, which has been heated to be molten, is extruded in the horizontal direction, once cooled and sized, thereafter, the tubular resin is uniformly heated with the heating applied on the vertically lower side and the heating applied on the vertically upper side of the tubular resin being controlled separately of each other so as to prevent ununiformity of the heating of the tubular resin in the circumferential direction thereof due to the elevation in heat caused by a thermal convection phenomenon when the resin is heated prior to the orientation, then, the tubular resin is oriented, and thereafter, folded under heat treatment.

To achieve the above-described object, the apparatus according to the present invention is of such an arrangement that an external sizing mechanism is closely attached to an extruder having mounted thereon a die, a die orifice of which is directed in the horizontal direction, the tubular resin is introduced into a heating vessel at a constant speed in the horizontal direction through a transfer speed regulating mechanism, the vertically lower side and the vertically upper side of this heating vessel can be controlled separately of each other, and further, a heat treating mechanism is additionally provided in a bubble guide section for flattening the tubular resin after the orientation.

DETAILED DESCRIPTION OF THE PREFERRED EMBODIMENT

Description will hereunder be given of the present invention with reference to the drawings.

Figure 1:
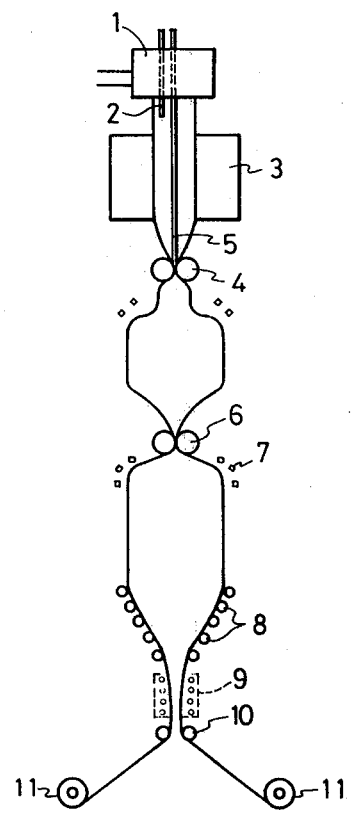
FIG. 1 is a schematic diagram showing the oriented sheet or film producing apparatus according to the conventional, vertical type tubular method.
Figure 2:
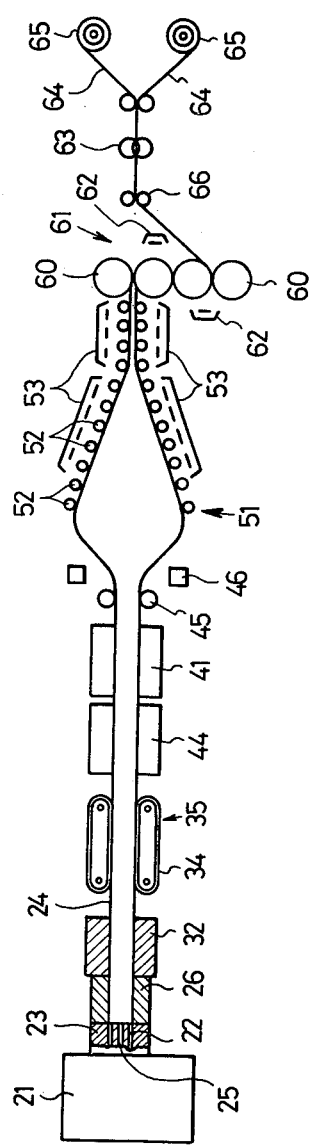
FIG. 2 is a schematic diagram showing one embodiment of the oriented sheet or film producing apparatus according to the present invention.

FIG. 2 shows an embodiment of the apparatus according to the present invention. In the drawing, a die 23, an annular die orifice 22 of which is directed in the horizontal direction, is provided at one side of an extruder 21. A fluid feed port 25 is formed at the central portion of the die orifice 22 of this die 23, and the extruder 21 is provided with a pressure fluid feed mechanism, not shown, for feeding pressure fluid into a tubular resin 24 extruded into a tubular form from the die 23 through the fluid feed port 25. The fluid fed under pressure from the pressure fluid feed mechanism into the tubular resin 24 may desirably be a gas inactive with the molten resin, and generally, nitrogen gas, air or the like is used. Furthermore, the outlet temperature of the tubular resin 24 extruded from the die orifice 22 of the die 23 may preferably be an extrudable temperature as low as possible within a range of temperatures above a first-order transition temperature or a fluidization starting temperature of the resin 24.

An external sizing mold or mechanism 26 is provided at a position contiguous to the die 23. The external sizing mechanism 26 is closely attached to the die 23, lest the tubular resin 24 having sealed therein the pressure fluid should expand to the outside through a gap between the die 23 and the external sizing mechanism 26 to cause trouble in the succeeding forming work.

Figure 3:
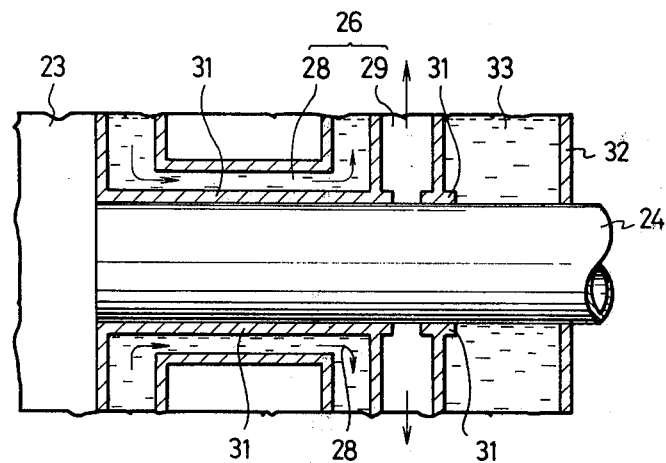
FIGS. 3 through 5 are enlarged views showing the essential portions diffierent from one another in the aforesaid embodiment, respectively.

As enlargedly shown in FIG. 3, this external sizing mechanism 26 is provided with cooling means 28 utilizing the flow of a cooling agent such as water and attracting means 29 utilizing a vacuum, whereby the outer diameter of the tubular resin 24 is regulated from outside by a regulating member 31 while the tubular resin 24 is cooled by the cooling agent being in contact with the outer periphery thereof. The cooling means 28 may preferably be capable of quickly cooling, and particularly, when polypropylene resin is quickly cooled, the transparence thereof can be improved accordingly. A cooling vessel 32 is contiguous to the external sizing mechanism 26, and the tubular resin 24 is passed through the cooling agent 33 stored in this cooling vessel 32, whereby the tubular resin 24 is cooled to a temperature lower than a second-order transition temperature, or a softening point of the resin 24. Furthermore, the cooling vessel 32 is provided with temperature regulating means, not shown, so that the cooling temperature can be regulated in accordance with the type and the thickness of the resin. The cooling agent 33 may be any one, as long as it is inactive with the tubular resin 24, such for example as a mixture of water with ethylene glycol.

The tubular resin 24, which has been passed through the cooling vessel 32, is fed to a transfer speed regulating mechanism 35 comprising rubber endless belts having movable surfaces 34 coming into frictional contact with the outer periphery of the tubular resin 24, guided and supported by this transfer speed regulating mechanism 35 in a manner to be transferred at a constant speed in the horizontal direction of the tubular resin 24 and the percent of stretch can be regulated in the machine direction.

Figure 4:
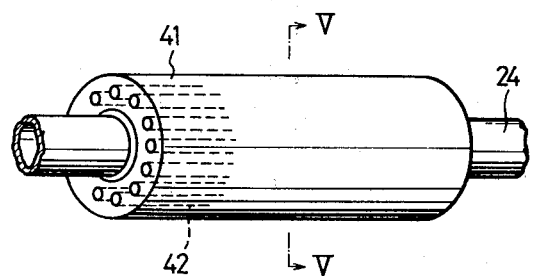
Figure 5:
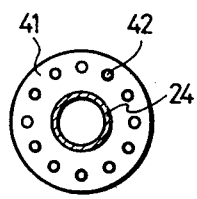
Figure 8:
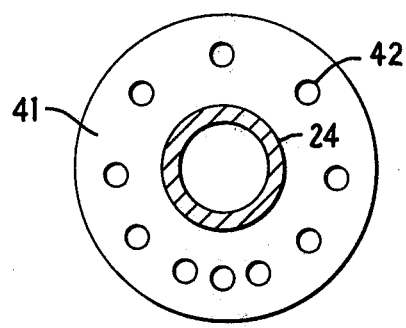
FIG. 8 is a sectional view of an alternative embodiment of the heating mechanism used in the invention.

Provided at the same height as the transfer speed regulating mechanism 35 on one side thereof in the machine direction of the tubular resin 24 is a heating vessel 41, whereby the tubular resin 24 is surrounded by this heating vessel 41 and uniformly heated in the circumferential direction thereof. More specifically, as shown in FIGS. 4 and 5, the heating vessel 41 is provided therein with a plurality of heating elements 42 each comprising an infrared heater or the like having a predetermined length extending in the horizontal direction, i.e., the flowing direction of the tubular resin 24 in a manner to surround the tubular resin 24 along a hypothetical circumference centered about the center axis of the tubular resin 24. These heating elements 42 are arranged to be controlled separately of one another. For instance, when the vertically upper side of the heating vessel 41 becomes higher in temperature than the vertically lower side thereof due to a thermal convection phenomenon, a temperature sensor or the like, not shown, detects it, whereby only the heating on the vertically upper side is stopped, so that the tubular resin 24 can be uniformly heated along the circumferential direction thereof. Additionally, such an arrangement may be adopted that the intervals between the heating elements 42 are decreased from the vertically upper side to the vertically lower side, i.e., the arrangement of the heating elements 42 is made denser from the upper side to the lower side of the heating vessel 41 as shown in FIG. 8.

Figure 6:
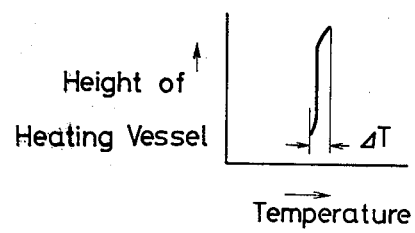
FIG. 6 is a graphic chart showing the temperature characteristics in the heating vessel.

The heating elements 42 on the vertically upper side and those on the vertically lower side are controlled such that a difference in temperature between the upper surface and the lower surface of the tubular resin 24 can be maintained within a range of ±1.5° C. (Refer to FIG. 6). Furthermore, when an ununiform section takes place in the tubular resin 24, the heating is controlled in accordance with the ununiform section. Additionally, if a hot water bath is used in the heating vessel 41 in order to uniformly heat the tubular resin 24, it is difficult to remove hot water, which adheres to the tubular resin 24, and moreover, out of the ununiform section of the tubular resin 24, the thinner portion quickly expands during orientation, thus preventing a sheet or film uniform in thickness from being obtained. Therefore, this hot water bath is not desirable.

When a resin high in rigidity and low in thermal conductivity, such as polystyrene, is used as the tubular resin 24, or a resin sheet large in thickness is to be produced, it is preferable to provide a preheating vessel 44 in front of the aforesaid heating vessel 41 for avoiding the thermal ununiformity in the interior of the resin due to the quick heating by the heating vessel 41. This preheating vessel 44 should be constructed such that the tubular resin 24 is uniformly heated along the circumferential direction thereof in the same manner as with the heating vessel 41.

A pair of tubular resin outer diameter regulating members 45 are each provided about at a position where the tubular resin 24, which has been heated by the heating vessel 41, reached an orientation temperature and is about to cause a necking, in the machine direction of the tubular resin 24, whereby an orientation point is fixed, so that the orientation can be smoothly and stably carried out. Each tubular resin outer diameter regulating member 45 is provided with a contact portion, not shown, coming into contact with the outer peripheral surface of the tubular resin 24, whereby the tubular resin 24 can be held in a regular shape through the agency of these contact portions, so that the orientation point can be fixed. When the tubular resin 24 is a resin, the outer surface of which is easily damaged, such as polystyrene resin, the contact portions are preferably formed of roller-like members or the like, which are rotatable at a circumferential speed equal to the transfer speed of the tubular resin 24.

The tubular resin 24, the orientation point of which has been regulated by the tubular resin outer diameter regulating members 45, is oriented immediately after it is passed through the tubular resin outer diameter regulating members 45. However, when a resin high in rigidity such as polystyrene is used, or a sheet having a large thickness is to be produced, it is preferable that, to perform orientation more smoothly, an air ring 46 is provided and hot air is adapted to be blown onto the outer periphery of the tubular resin 24 during orientation through the agency of the air ring 46. In addition, this air ring 46 may be replaced by some other means for partially heating or cooling the tubular resin 24 during orientation, such for example as heat radiation by an infrared heater or blowing of cooled air.

The tubular resin 24 after being oriented is led to a bubble guide section 51 provided at a position having a height equal to the tubular resin outer diameter after the regulating members 45 and spaced apart a predetermined distance therefrom in the machine direction of the tubular resin 24. This bubble guide section 51 comprises a plurality of roller members 52 arranged progressively narrower so that the tubular resin 24 is folded as it proceeds in the machine direction. To smoothly fold the tubular resin 24 after being oriented, it is preferable that the surfaces of the roller members 52 are subjected to chrome plating or Teflon (Trade Mark: polytetrafluoroethylene) coating.

Figure 7:
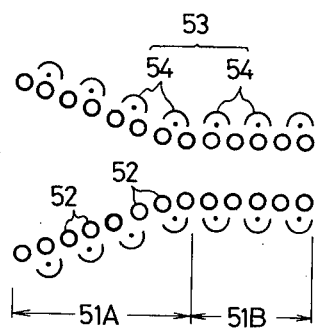
FIG. 7 is an enlarged view showing other essential portions of the aforesaid embodiment.

When a resin high in rigidity such as polystyrene is used, or a sheet large in thickness is to be produced, it is preferable that, to remove the wrinkles, sags, curls and the like from the tubular resin 24, the bubble guide section 51 comprises a first guide subsection 51A where a plurality of roller members 52 are arranged progressively narrower and a second guide subsection 51B, as shown in FIG. 7. Here, the second guide subsection 51B comprises a group of roller members 52 arranged in parallel to each other at opposite sides of the tubular resin 24 thus folded in a manner to clamp the tubular resin 24, whereby even if sags or curls are caused to the tubular resin 24 in the first guide subsection 51A, such sags or curls are removed by the roller members 52 arranged in the second guide subsection 51B.

The guide section 51 is additionally provided with a heat treating mechanism 53 for annealing in order to thermally fix the orientation of the tubular resin 24 after being oriented. It is preferable that this heat treating mechanism 53 is of such an arrangement that the heat treating mechanism comprises heating elements 54, i.e., a plurality of infrared heaters provided behind the roller members 52 of the guide section 51 and the heat treating mechanism is progressively increased in heating capacity toward the succeeding pinch rolls 61 as shown in FIG. 7, for example. The tubular resin 24 is heated by the heat treating mechanism 53 to be subjected to a heat treatment and protected against the wrinkles, sags or curls which would otherwise occur therein during folding, and these advantages are remarkable when a resin high in rigidity such as polystyrene is used, or a sheet large in thickness is to be formed, in particular. In addition, it is preferable that the heat treating mechanism 53 has at least two temperature sensors (not shown) in the machine direction of the tubular resin 24 and in the direction perpendicularly intersecting the machine direction of the tubular resin 24, respectively, and these temperature sensors are controlled in heating capacity, respectively, whereby the tubular resin 24 can be properly heat-treated and folded in accordance with the type and size of the tubular resin.

Provided at one side of the guide section 51 in the machine direction of the tubular resin 24 are pinch rolls 61 consisting of a plurality of rolls 60 for clamping the tubular resin 24 in a manner to perfectly collapse the hollow portion of the tubular resin 24. Through the agency of these pinch rolls 61, the tubular resin 24 thus folded can be free from sags or curls and the pressure fluid contained in the tubular resin 24 is prevented from leaking out. These pinch rolls 61 are provided with temperature regulating mechanisms 62 regulated in a manner to be progressively decreased in temperature in the machine direction of the tubular resin 24. These temperature regulating mechanisms 62 may be provided in the pinch rolls 61 or the pinch rolls 61 may be provided close to the temperature regulating mechanisms 62.

After the tubular resin 24 has been passed through the pinch rolls 61, the opposite pleats of the tubular resin 24 folded by the pinch rolls 61 are successively shorn by a shearing mechanism 63 into two resin sheets 64 or resin films. These resin sheets 64 are respectively wound by a takeup mechanism 65 at a takeup speed faster than the transfer speed of the tubular resin 24 regulated by the aforesaid transfer speed regulating mechanism 35. In addition, in the case of a shrink film used in coating a steel pipe or the like, the shearing mechanism may be dispensed with. Denoted at 66 in FIG. 2 are tension rollers.

According to the production method and the apparatus therefor of the present invention, the heating vessel 41 is adapted to uniformly heat the tubular resin 24 being transferred at a constant speed in the horizontal direction along the circumferential direction thereof, so that a stable orientation can be effected without causing an ununiform section or the like to the tubular resin 24.

As seen in the case of using a material low in thermal conductivity, such as polystyrene, as tubular resin 24, or of producing a resin sheet being large in thickness by use of some other resin, it is preferable to slowly heat the tubular resin at a comparatively low temperature by the heating vessel 41. In that case, a long heating region is required and the heating vessel 41 should necessarily be long. However, according to the above-described production method and the apparatus therefor of the present invention, the apparatus is extended only in the horizontal direction, and hence, such disadvantages of the prior art that the apparatus is extended vertically upwardly can be obviated, which results in various problems in the position of installation, controllability, safety and the like.

Further, since the tubular resin 24 is transferred in the horizontal direction, such advantages can be offered that the heating of the tubular resin 24 in the machine direction thereof can be easily controlled, and moreover, even if the cooling agent 33 in the cooling vessel 32 is adhered to the surface of the tubular resin 24 and leaks out of the cooling vessel 32, the cooling agent 33 can be readily dropped from the surface of the tubular resin 24.

Furthermore, since the tubular resin outer diameter regulating members 45 are provided at about a position where the tubular resin 24 undergoes necking, such an advantage can be offered that the orientation point is reliably fixed and the stable orientation can be effected.

If the bubble guide section 51 is additionally provided with at least two or more heat treating mechanisms 53 capable of controlling the temperature in the machine direction of the tubular resin 24 (i.e., bubble) and the circumferential direction thereof, respectively, as described above, then both the flattening and the heat treatment of the tubular resin 24, which has been oriented, are simultaneously effected because of the additional provision of the heat treating mechanisms 53, and such an advantage can be offered that, even with polystyrene resin and other resins used for producing a sheet large in thickness, wrinkles, sags, curls and the like are prevented from occurring.

Resins usable for the producion method and the apparatus therefor according to the present invention include polystyrene, a mixture of polystyrene with any other resin, resins of the polyolefin group, a mixture between resins of polyolefin group, polyethylene terephthalate, polyvinyl chloride, crystalline and non-crystalline thermoplastic resins of polyamide or the like, and it is particularly suitable for producing sheets having a thickness of about 0.1 mm or more to use the above-described resins.

Detailed description will hereunder be given of the present invention in conjunction with the following example. However, the present invention will not be restricted by the following example unless the technical gist thereof is changed.

EXAMPLE

Atactic polystyrene (manufactured by Idemitsu Petrochemical Co., Ltd.) of a density $\rho = 1.05$ g/cm$^3$, melt index MI=4.0 g/10 min, Vicat softening point 105° C. (in conformity to JIS—Japanese Industrial Standard—K7206) and high in rigidity was fed to an extruder 21 of caliber diameter of 65 mm, and the tubular resin 24 having an outer diameter of 62 mm and a wall thickness of 6 mm was extruded at a speed of 31 cm/min and at a temperature of 185° C. which was lower than the ordinary extrusion temperature of 200°–210° C. and by 80° C. higher than the Vicat softening point, with compressed air (0.1 Kg/cm$^2$) being blown into the tubular resin 24. The tubular resin 24 thus extruded was led to the external sizing mechanism 26 disposed immediately behind the die 23. Cooling water of 15° C. was circulated through the cooling means 28 of the external sizing mechanism 26, and the attracting means 29 performed sizing of the tubular resin 24 at a degree of attracting vacuum of 55 cmHg. Thereafter, the temperature of the tubular resin 24 was cooled to 45° C. by the cooling vessel 32, through which was circulated cooling water of 15° C.

The liquid adhered to the surface of the tubular resin 24 was removed, the tubular resin 24 was introduced into the heating vessel 41 having a temperature in the tank of 200° C. through the transfer speed regulating mechanism 35, and the tubular resin 24 was heated so that the temperature of the tubular resin 24 on the outer surface in the circumferential direction thereof reached 110° C. at the outlet of the vessel.

Twelve heating elements 42 each comprising a long rod-like infrared heater, were arranged along the circumferential direction of the tubular resin 24 at regular intervals in the heating vessel 41. These infrared heaters were controlled in temperature separately of one another and heated so that the difference in temperature between the upper and the lower surfaces of the tubular resin 24 could remain within the range of ±1.5° C. The reason why the infrared heaters were formed into long shapes here was that the tubular resin 24 was slowly heated at a low temperature in the machine direction thereof, so that the inner and the outer sides of the tubular resin 24 could be uniformly heated.

The tubular resin 24 was heated to a temperature by 20° C. higher than the second order transition temperature by the heating vessel 41, then, the necking portion of the tubular resin 24 was supported by the tubular resin outer diameter regulating members 45 having four rolls on upper, lower, right and left sides of the tubular resin 24 as being the portions in contact with the tubular resin 24 so as to fix the orientation point, and thereafter, the tubular resin 24 was expanded by compressed air to six times in the machine direction (MD) and five times in the transverse direction (TD).

Subsequently, the tubular resin 24 was led to the guide section 51 having the first and the second guide subsections 51A and 52A, subjected to heat treatment and folded into a flat shape, while wrinkles, sags and the like were removed therefrom, and the tubular resin 24 was folded into a perfect flat shape, while curls were removed therefrom, by pinch rolls 61 comprising four rollers 60 heated to about 95° C., 95° C., 85° C. and 75° C., respectively, and progressively lowered in temperature in the machine direction of the tubular resin 24.

Thereafter, wrinkles and sags were further removed while a tension is applied to the resin by use of the tension rollers 66, and the pleats were cut open by the shearing mechanism 63, whereby the two resin sheets 64 each having a thickness of 0.2 mm were formed.

The resin sheet 64 thus obtained and the resin sheet obtained by the successive biaxial orientation according to the conventional tenter method were measured in their physical properties and the results will be shown in Table 1. In addition, heretofore, there has not been produced any sheet or film of polystyrene by the simultaneous biaxial orientation according to the tenter method.

As apparent from Table 1, according to the present invention, an inflation biaxially oriented sheet excellent in physical properties can be produced safely and with a high yield by the horizontal blowing, one-stage compressed-air simultaneous biaxial orientation method without using the conventional tenter method having the apparatus being large-sized, complicated in construction and low in operating efficiency. Furthermore, according to the present invention, sheets excellent in physical properties can be produced by use of an apparatus simplified in construction, and moreover, the trimming loss in the material, which would have been caused by the conventional tenter method, can be eliminated, and hence, excellent sheets can be supplied to buyers at low cost, thus contributing to the development of the industry to a considerable extent.

TABLE 1

| TEST ITEMS OF PHYSICAL PROPERTIES | | SAMPLE | |
|---|---|---|---|
| | | EXAMPLE (VALUE) | EXAMPLE *1 FOR REFERENCE (VALUE) |
| TENSILE *2 PROPERTIES MD/TD | TENSILE MODULUS (Kg/cm$^2$) | 39600/39100 | 35100/34200 |
| | TENSILE STRENGTH at BREAK (kg/cm$^2$) | 810/825 | 722/734 |

TABLE 1-continued

| TEST ITEMS OF PHYSICAL PROPERTIES | | SAMPLE | |
|---|---|---|---|
| | | EXAMPLE (VALUE) | EXAMPLE *1 FOR REFERENCE (VALUE) |
| | ELONGATION at BREAK (%) | 3/3 | 4/4 |
| FILM IMPACT *3 (kg-cm/cm) | | 540 | 430 |
| TENSILE IMPACT STRENGTH: *4 MD/TD (Kg-cm/cm$^2$) | | 58/62 | 41/40 |
| OPTICAL PROPERTIES | HAZE *5 (%) | 1 | 1 |
| | SPECULAR *6 GLOSS (%) | 176 | 152 |
| HEAT SHRINKAGE *7 MD/TD (%) | | 71/62 | 71/59 |

Explanatory notes:
*1 Example for reference: Saint Clear (phonetic) (having a thickness of 0.21 mm) a trade name of a biaxially oriented polystyrene resin manufactured by Mitsubishi Monsanto Kasei Kabushiki Kaisha according to the successive biaxial orientation tenter method.
*2 Tensile properties: in conformity with JIS K6871, respectively.
*3 Film impact: Tests were conducted by use of a film impact tester manufactured by Kabushiki Kaisha Toyo Seiki Seisakusho at a load of 30 kg, with the diameter of tip notch being 1 inch.
*4 Tensile impact strength: in conformity to ASTM D1822.
*5 Haze: in conformity to ASTM (American Society for Testing Materials) D1003.
*6 Specular gloss: in conformity to ASTM D523.
*7 Degree of heat shrinkage: in conformity to JIS K6872.

What is claimed:

1. A method of continuously producing a biaxially oriented thermoplastic resin sheet which comprises:
   extruding a molten thermoplastic resin in a horizontal direction of travel from a die to form a tube of said resin while injecting a fluid under pressure into the hollow interior of said tube;
   then passing said tube horizontally through a sizing mold immediately after said tube is extruded from said die, such that the outer periphery of said tube conforms to said mold, said sizing mold thereby maintaining said tube in the same shape;
   cooling said tube to a temperature lower than the softening point of said resin, whereby said tube is not deformed by internal pressure exerted by said fluid;
   then passing said tube further horizontally in the direction of travel thereof by means of a transfer speed regulating mechanism which engages the outer periphery of said tube;
   then passing said tube through a heating zone wherein said tube is subjected to a temperature gradient such that the lower vertical outer surface of said tube is heated to an extent greater than the upper vertical outer surface of said tube, the upper half of said tube being additionally heated by upwardly directed convection heating, whereby the temperature of said tube is increased substantially uniformly as said tube continues to move horizontally to a temperature higher than the softening point of said resin but lower than the melting point thereof, the diameter of said tube remaining substantially constant;
   then passing said tube horizontally out of said heating zone and into a necking zone defined by a plurality of necking members which guide, support and define the shape of said tube as said tube passes therebetween, said tube being at an orientation temperature;
   then simultaneously biaxially orienting said tube as said tube continues to move horizontally by expanding said tube radially to form a bubble-shaped portion of said tube by means of said internal fluid pressure, and said bubble-shaped, oriented portion of said tube moves at a speed faster than the speed of transfer of said tube in the horizontal direction;
   then collapsing and thereby folding said bubble-shaped portion of said tube, while heating said bubble-shaped portion, to thereby flatten said tube to form a biaxially oriented, bilayered thermoplastic resin sheet.

2. A method as claimed in claim 1, wherein said tube is heated in said heating zone such that the temperature of said upper vertical outer surface of said tube is within 1.5° C. of the temperature of said lower vertical outer surface of said tube as said tube leaves said heating zone.

3. A method as claimed in claim 2, wherein said temperature gradient in said heating zone is created by a plurality of horizontally elongated, parallel heating elements disposed in a surrounding relationship to said tube such that the axes of said heating elements define a cylindrical formation around said tube, said cylindrical formation is coaxial with said tube, and the intervals between said heating elements progressively decrease from the vertically upper end of said cylindrical formation to the vertically lower end of said cylindrical formation.

4. A method as claimed in claim 2, further comprising the steps of:
   continuously flowing a first cooling fluid radially inwardly relative to said tube along a passage in said sizing mold;
   flowing said first cooling fluid through said passage in the direction of travel of said tube such that said fluid undergoes heat exchange with said tube but is free of contact therewith, then flowing said first cooling fluid through said passage radially outwardly away from said tube;
   passing said tube horizontally through a suction chamber positioned to receive said tube from said sizing mold, and
   then passing said tube horizontally from said suction chamber into a cooling chamber to carry out said cooling step, wherein the outer periphery of said tube is brought into direct contact with a second cooling fluid.

5. A method as claimed in claim 2, further comprising the steps of:
   contacting said bubble-shaped portion of said tube with a first set of bubble guiding members disposed vertically above and below said bubble-shaped portion, said first set of guide members including a plurality of upper guide members above said bubble-shaped portion of said tube disposed in a planar formation that slants downwardly in the direction of travel of said tube and a plurality of lower guide members below said bubble-shaped portion of said tube disposed in a planar formation that slants upwardly in the direction of travel of said tube, whereby said first set of guide members flatten said bubble-shaped portion to form a flattened tube therefrom as said bubble-shaped portion moves horizontally thereagainst;

then contacting said flattened tube with a second set of guide members disposed in two parallel, horizontal planar rows above and below said flattened tube, each of said rows comprising a plurality of said second guide members; and then passing said flattened tube between a pair of adjacent, substantially tangent upper and lower first and second pinch rolls which collapse said flattend tube to form said biaxially oriented, bilayered thermoplastic resin sheet.

6. A method as claimed in claim 5, further comprising the step of heating said bubble-shapd portion of said tube and said flattened tube to a progressively greater degree as said tube contacts said guiding members and moves progressively closer to said pinch rolls.

7. A method as claimed in claim 5, further comprising the steps of:

passing said resin sheet along the curved peripheral surface of said lower pinch roll while heating said sheet;

then passing said resin sheet from said lower pinch roll to the curved peripheral surface of a third pinch roll disposed directly beneath said lower pinch roll and substantially tangent therewith while heating said sheet, thereby further flattening said sheet;

then passing said resin sheet between said third pinch roll and a fourth pinch roll disposed directly beneath said third pinch roll substantially tangent therewith, thereby further flattening said sheet, said sheet thereby assuming an S-shaped conformation by means of said pinch rolls;

then trimming opposite edge portions of said bilayered sheet and said sheet continues to move horizontally to form a pair of monolayered resin sheets; and then winding up each of said monolayered sheets to form a product roll thereof.

8. An apparatus for producing a biaxially oriented, thermoplastic resin sheet which comprises:

an extruder adapted to continuously extrude a molten resin in a horizontal direction of travel to form a tube made of said resin;

pressurized fluid feeding means for injecting a pressurized fluid into the interior of said tube as said tube is formed by said extruder;

a sizing mold provided adjacent to said extruder such that said tube passes through an interior cavity of said mold as said tube is continuously produced by said extruder, said sizing mold being effective to maintain the shape of said tube against pressure exerted by said pressurized fluid;

a cooling mechanism positioned to receive said tube which is moving horizontally from said sizing mold and cool said tube to a temperature below the softening point of said resin;

a transfer speed regulating mechanism having movable surfaces thereof positioned to receive said tube which is moving horizontally from said cooling mechanism and adapted to frictionally engage the outer periphery of said tube and thereby regulate the rate of horizontal movement thereof;

a heating mechanism positioned to receive said horizontally moving tube into an interior chamber thereof from said transfer speed regulating mechanism, said heating mechanism comprising a plurality of horizontally elongated heating elements which are disposed in parallel within said interior chamber such that the axes thereof define a cylindrical formation which surrounds said tube as said tube passes through said heating mechanism, said cylindrical formation being coaxial with the axis of said tube, said heating elements including means for heating the lower vertical outer surface of said tube to a greater extent than the upper vertical outer surface of said tube, the upper vertical half of said tube being additionally heated by convection heating, whereby the temperature of said tube is increased substantially uniformly as said tube continues to move horizontally within said interior chamber of said heating mechanism to a temperature higher than the softening point of said resin but lower than the melting point thereof;

a plurality of necking members positioned to receive therebetween said horizontally moving tube from said heating mechanism, whereby said necking members guide, support and define the shape of said tube as said tube passes therebetween, such that said tube expands to form a bubble-shaped portion thereof due to the pressure of said pressurized fluid after said tube moves horizontally beyond said necking members, whereby said tube is simultaneously biaxially oriented;

a plurality of bubble guiding members positioned to receive said bubble-shaped portion of said tube from said necking members and progressively flatten said bubble-shaped portion as said bubble-shaped portion moves horizontally and contacts said bubble guiding members;

a heating mechanism adapted to heat said bubble-shaped portion of said tube as said bubble-shaped portion is flattened by said bubble guiding members, including means for progressively increasing the degree of heating of said bubble-shaped portion as said bubble-shaped portion continues to move along said bubble guiding members;

a plurality of pinch rolls positioned to receive said flattened, bubble-shaped portion of said tube from said bubble guiding members, said pinch rolls including means for completely collapsing said tube and forming a bilayered resin sheet therefrom; and a take-up mechanism positioned to receive said resin sheet from said pinch rolls.

9. An apparatus as claimed in claim 8, wherein the intervals between said heating elements progressively decrease from the vertically upper end of said cylindrical formation to the vertically lower end of said cylindrical formation.

10. An apparatus as claimed in claim 8, wherein said sizing mold further comprises means defining a passage in said sizing mold, whereby a cooling fluid can be continuously flowed radially inwardly relative to said tube through said passage when said tube is disposed within said sizing mold, then flowed parallel to the direction of travel of said tube such that said fluid undergoes heat exchange with said tube, and then flowed through said passage radially outwardly away from said tube.

11. An apparatus as claimed in claim 10, further comprising means defining a suction chamber positioned to receive said tube from said sizing mold, said suction chamber being directly interposed between said sizing mold and said cooling mechanism, said cooling mechanism comprising a vessel containing a cooling agent therein, such that said tube passes through said vessel and the outer periphery of said tube is brought into direct contact with said cooling agent.

12. An apparatus as claimed in claim 8, wherein said bubble guiding members further comprises a first set of bubble guiding members disposed vertically above and below said bubble-shaped portion of said tube, said first set of guide members including a plurality of upper guide members above said bubble-shaped portion of said tube disposed in a planar formation that slants downwardly in the direction of travel of said tube and a plurality of lower guide members below said bubble-shaped portion of said tube disposed in a planar formation that slants upwardly in the direction of travel of said tube, whereby said first set of guide members flatten said bubble-shaped portion of said tube to form a flattened tube therefrom, as said bubble-shaped portion moves horizontally thereagainst, and a second set of guide members disposed in two parallel, horizontal, planar rows above and below said flattened tube in contact therewith, each of said rows comprising a plurality of said guide members.

13. A method as claimed in claim 12, further comprising means for heating said bubble-shaped portion of said tube and said flattened tube to a progressively greater degree as said tube contacts said guiding members and moves progressively closer to said pinch rolls.

14. An apparatus as claimed in claim 12, further comprising four of said pinch rolls disposed in a vertically stacked relationship in substantially tangent contact with each other on the curved peripheral surfaces thereof, said pinch rolls being adapted to conduct said resin sheet therebetween along the curved peripheral surfaces of the innermost two of said four pinch rolls such that said resin sheet assumes an S-shaped conformation and is thereby passed three times between substantially tangent pinch rolls, and is thus flattened three times, and means for heating said resin sheet as said resin sheet moves in contact with said pinch rolls.

15. An apparatus as claimed in claim 13, further comprising means for trimming opposite edge portions of said bilayered sheet as said bilayered sheet continues to move horizontally, to thereby form a pair of monolayered resin sheets; and means for separately winding up each of said monolayered sheets to form a product roll thereof.

* * * * *

UNITED STATES PATENT AND TRADEMARK OFFICE
CERTIFICATE OF CORRECTION

PATENT NO. : 4,443,399
DATED     : April 17, 1984
INVENTOR(S) : Masao Takashige et al It is certified that error appears in the above-identified patent and that said Letters Patent is hereby corrected as shown below:

Column 11, line 20;  change "flattend" to ---flattened---.
Column 11, line 23;  change "bubble-shapd" to ---bubble-shaped---.
Column 13, line 15;  change "comprises" to ---comprise---.
Column 14, line 21;  change "claim 13" to ---claim 14---.

Signed and Sealed this

Twenty-eighth Day of August 1984

[SEAL]

Attest:

GERALD J. MOSSINGHOFF

Attesting Officer    Commissioner of Patents and Trademarks